`US006791826B2`

United States Patent
Ho

(10) Patent No.: US 6,791,826 B2
(45) Date of Patent: Sep. 14, 2004

(54) HINGE DEVICE INSTALLED BETWEEN A ROTATABLE PANEL AND A COMPUTING MODULE

(75) Inventor: Pei-Jan Ho, Taipei Hsien (TW)

(73) Assignees: Wistron Corporation, Taipei Hsien (TW); Acer Incorporated, Taipei Hsien (TW)

( * ) Notice: Subject to any disclaimer, the term of this patent is extended or adjusted under 35 U.S.C. 154(b) by 280 days.

(21) Appl. No.: 09/683,550

(22) Filed: Jan. 17, 2002

(65) Prior Publication Data

US 2002/0097217 A1 Jul. 25, 2002

(30) Foreign Application Priority Data

Jan. 19, 2001 (TW) .................................... 90101319 A

(51) Int. Cl.[7] .............................................. G06F 1/16
(52) U.S. Cl. ..................... 361/683; 361/681; 345/156
(58) Field of Search ................................ 345/158, 156; 341/22; 16/282; 361/83, 683, 681

(56) References Cited

U.S. PATENT DOCUMENTS

| | | | | |
|---|---|---|---|---|
| 5,749,124 A | * | 5/1998 | Lu | 16/307 |
| 5,774,939 A | * | 7/1998 | Lu | 16/342 |
| 6,249,426 B1 | * | 6/2001 | O'Neal et al. | 361/681 |
| 6,256,838 B1 | * | 7/2001 | Lu | 16/342 |
| 6,297,946 B2 | * | 10/2001 | O'Neal et al. | 361/681 |
| 6,408,485 B1 | * | 6/2002 | Wu | 16/342 |
| 6,453,509 B1 | * | 9/2002 | Shin | 16/340 |
| 6,481,057 B2 | * | 11/2002 | Lin | 16/340 |

* cited by examiner

*Primary Examiner*—Edward F. Urban
*Assistant Examiner*—Shaima Q. Aminzay
(74) *Attorney, Agent, or Firm*—Winston Hsu

(57) ABSTRACT

A hinge device installed between a rotatable panel and a computing module, having a keyboard installed thereon, has a first connection rod and a second connection rod. The first connection rod has a connection end connected to the rotatable panel, and a protruding end. The second connection rod has a hollow cylinder, a connection end connected to the keyboard for transferring torque to rotate the rotatable panel, and an indented end, having an engaging groove, for connecting with the protruding end of the first connection rod. When the protruding end engages with the engaging groove, the second connection rod will rotate with the first connection rod.

12 Claims, 9 Drawing Sheets

HINGE DEVICE INSTALLED BETWEEN A ROTATABLE PANEL AND A COMPUTING MODULE

BACKGROUND OF INVENTION

1. Field of the Invention

The present invention relates to a hinge device of a keyboard having pop-up keys, and more specifically, to a hinge device that enables a keyboard of a notebook computer to pop up when a display panel of the notebook rotates.

2. Description of the Prior Art

Due to continuous improvement in portable computers, it is the present trend of the notebook computer industry to fabricate products with smaller size and lighter weight. However, it is not easy to minimize the size of some key components of the notebook computer such as a mainboard. Therefore, an alternative solution to minimizing the thickness of the notebook computer is by reducing the heights and sizes of other components such as liquid crystal display (LCD) panels, housings, and keyboards.

One of the solutions of minimizing the height of a keyboard, which has keys with a significant height due to a strike stroke needed, is revealed in U.S. Pat. No. 5,635,928. Please refer to FIG. 1 to FIG. 2b. FIG. 1 is a perspective view of a notebook computer 1 that has a keyboard with pop-up keys 11 according to the prior art. FIG. 2a and FIG. 2b each represent cross-sectional views of a hinge device 12 of the keyboard. FIG. 2a shows the notebook computer 1 when its display panel 10 is in an open position. FIG. 2b shows the notebook computer 1 when its display panel 10 is in a closed position. As shown in FIG. 1 to FIG. 2b, each of the keys 11 is connected to a movable base 111 of the notebook computer 1 by an elastic rod 112 and a rotatable rod 113. When the display panel 10 of the notebook computer 1 is moved from the open position to the closed position, the hinge device 12 rotates to make teeth 121 of the hinge device 12 engage with the movable base 111, shifting the movable base 111 a certain distance and thus drawing a corresponding elastic rod 112 of the key 11. Therefore, the key 11 is downwardly moved by the rotation of the rotatable rod 113, leading to a reduced thickness of the notebook computer 1. On the contrary, when the display panel 10 of the notebook computer 1 is moved from the closed position to the open position, the movable base 111 is led to the original position by the rotation of the hinge device 12. Meanwhile, the key 11 is upwardly moved by the rotation of the rotatable rod 113 to provide sufficient strike stroke.

However, a sufficiently large diameter of the hinge device 12 is normally needed to generate enough torque to move the movable base 111 and the multiple teeth 121 of the hinge device 12, thus increasing the size of the hinge device 12 as well. Theses two factors frequently cause a large space occupation of the hinge device 12, leading to either an increased manufacturing cost, an unattractive appearance of the notebook computer 1, or complicated arrangement of the components inside the notebook computer 1. In addition, the hinge device utilizes the teeth 121 to engage with the movable base 111. As the display panel 10 is rotated to an engaging position, a user has to rotate the display panel 10 with a large force. Therefore, it is very important to find an improvement for the hinge device 12 of the notebook computer 1 comprising the keyboard with pop-up keys 11.

SUMMARY OF INVENTION

It is therefore a primary object of the claimed invention to provide a hinge device that enables a keyboard of a notebook computer to pop up when a display panel of the notebook rotates, so as to efficiently minimize a thickness of the notebook computer.

According to the claimed invention, a notebook computer comprises a computing module having a keyboard installed thereon, a panel rotatable with respect to the computing module, and a hinge connected between the computing module and the panel. The hinge comprises a first connection rod, a second connection rod, and a gag lever. The first connection rod has a connection end connected to the panel, and a first engaging end. The second connection end comprises a hollow cylinder, a connection end connected to the keyboard for transferring torque to rotate the panel, and a second engaging end for connecting with the first engaging end of the first connection rod. The second engaging end has an engaging groove, so that the second connection rod will rotate with the first connection rod when the first engaging end engages with the engaging groove. The second connection rod further comprises a connection shaft and a transmission shaft. The connection shaft has an end inserted to the hollow cylinder and another end connected to the transmission shaft for transferring torque to the keyboard. The gag lever is inserted into an arc-shaped guide groove on the hollow cylinder for limiting movements of the connection shaft in the hollow cylinder.

It is an advantage of the claimed invention over the prior art that the space occupation of the hinge device is reduced by the internal design of the first and the second connection rods. In addition, the notebook computer in the claimed invention utilizes the protruding and indented ends and is thus friendlier to users. Consequently, the manufacturing cost of the notebook computer is reduced by the simplified arrangement of the components inside the notebook computer. In addition, the product is more competitive because of its convenient operation, improved appearance with minimized volume, and customer-oriented design.

These and other objectives of the claimed invention will no doubt become obvious to those of ordinary skill in the art after reading the following detailed description of the preferred embodiment, which is illustrated in the multiple figures and drawings.

BRIEF DESCRIPTION OF DRAWINGS

FIG. 4b is an exploded view of the hinge device shown in FIG. 4a.

DETAILED DESCRIPTION

Figure 1:
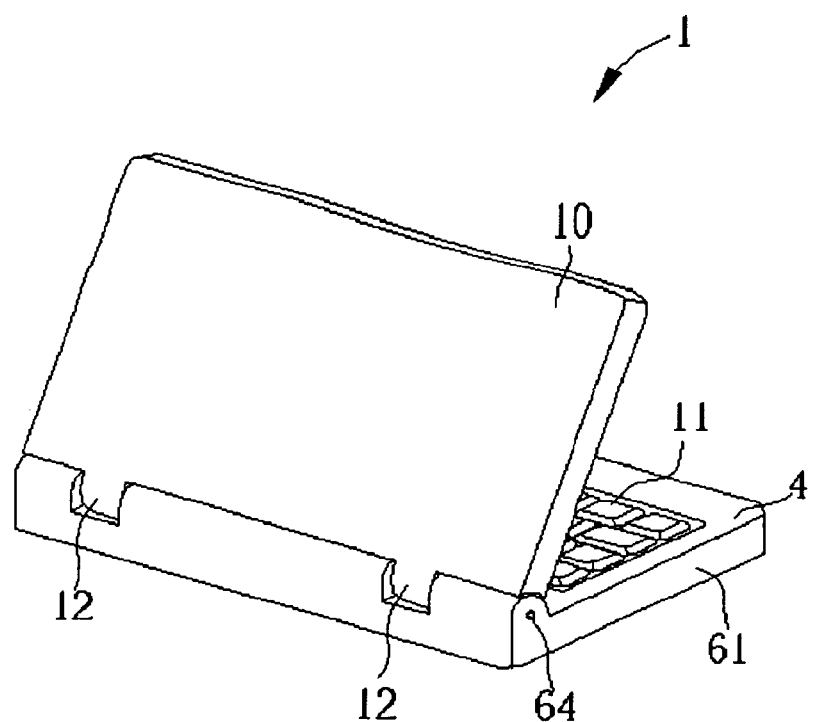
FIG. 1 is a perspective view of a notebook computer having a keyboard with pop-up keys according to the prior art.
Figure 2A:
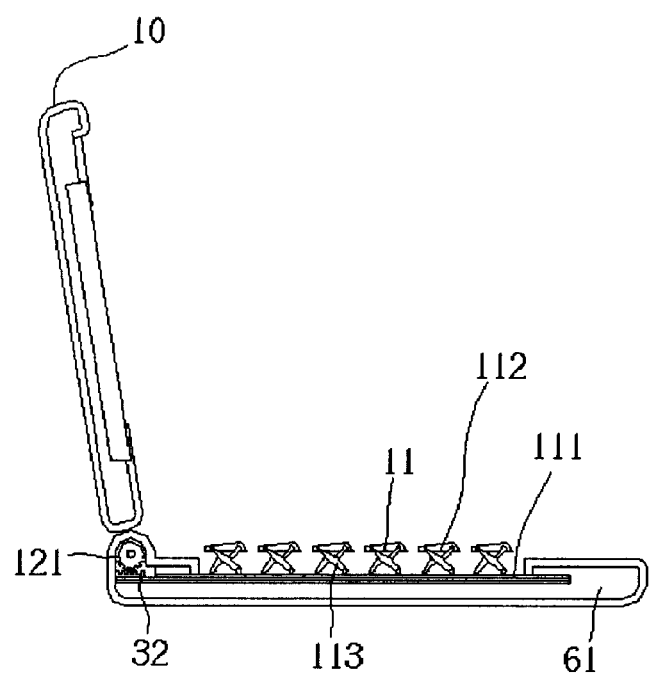
FIG. 2a is a cross-sectional view of a hinge device of the keyboard with pop-up keys when a display panel of the notebook computer in FIG. 1 is in an open position.
Figure 2B:
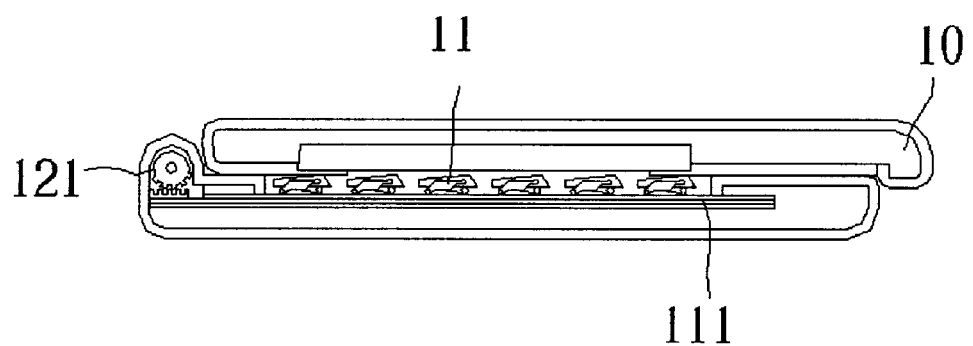
FIG. 2b is a cross-sectional view of the hinge device of the keyboard with pop-up keys when the display panel of the notebook computer in FIG. 1 is in a closed position.
Figure 3A:
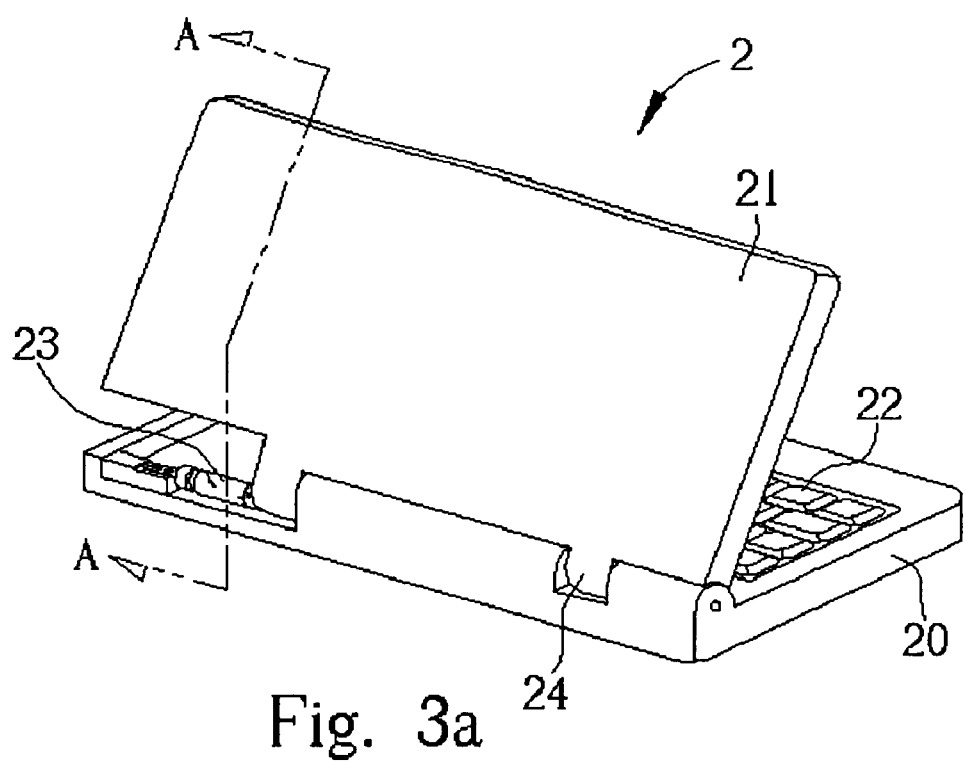
FIG. 3a is a perspective view of a notebook computer having a keyboard with pop-up keys according to the present invention.
Figure 3B:
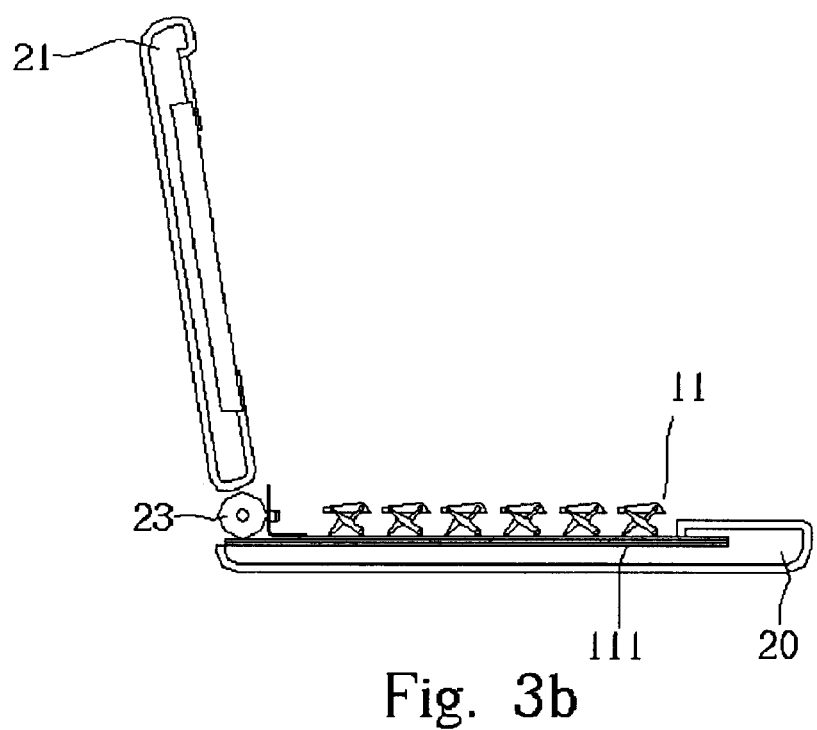
FIG. 3b is a cross-sectional view of the notebook computer in FIG. 3a when a display panel of the notebook computer is in an open position.
Figure 3C:
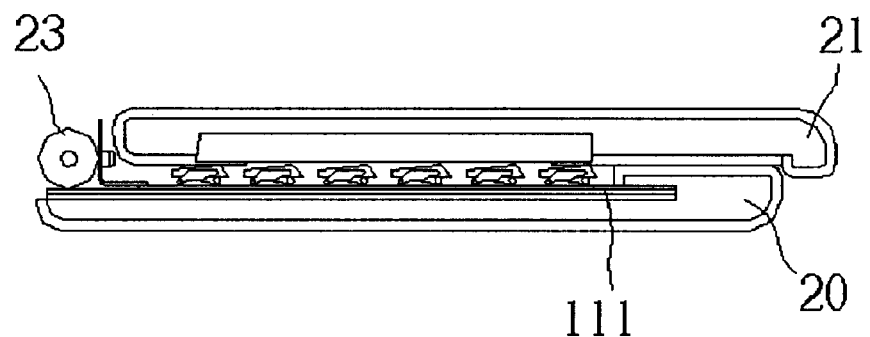
FIG. 3c is a cross-sectional view of the notebook computer in FIG. 3a when the display panel of the notebook computer is in a closed position.

Please refer to FIG. 3a to FIG. 3c. FIG. 3a is a perspective view of a notebook computer 2 having a keyboard with pop-up keys according to the present invention. FIG. 3b and FIG. 3c represent cross-sectional views along line A—A of the notebook computer 2 when a display panel 21 of the notebook computer 2 is in an open position and a closed position, respectively. As shown in FIG. 3a to FIG. 3c, the notebook computer 2 comprises a computing module 20, the display panel 21, a pop-up keyboard 22 installed on the computing module 20, and a hinge device 23 for transferring torque to the pop-up keyboard 22 as the display panel 21 rotates. The computing module 20 and the display panel 21 are similar to those in the prior art in both composition and function. The main difference is that portions of a housing of the notebook computer 2 adjacent to a connection portion of the computing module 20 and the display panel 21 need to be designed with respect to the hinge device 23. Each key 11 of the pop-up keyboard 22, like the key 11 in the prior art, is connected to a movable base 111 of the notebook computer 2 by an elastic rod 112 and a rotatable rod 113. For simplicity of description, the operation of the keys 11 in the present invention is not repeated since it is identical to the operation of the keys 11 in the prior art.

As shown in FIG. 3a to FIG. 3b, the hinge device 23 or a hinge 24 is normally installed between the display panel 21 and the computing module 20 so that the display panel 21 is rotatable with respect to the computing module 20 to a certain angle. In the preferred embodiment of the present invention, the hinge device 23 and the hinge 24 are respectively installed between the display panel 21 and the computing module 20 on two opposite sides. However, two hinges of a same type are installed between the display panel and the computing module in the prior art. In addition, the method revealed in U.S. Pat. No. 5,635,928 utilizes two hinges with teeth to engage with and provide sufficient and stable torque to the movable base, thus shifting the movable base. Under the limitation of either the number of the teeth or the space between two adjacent teeth, the rotational angle of the display panel with respect to the computing module 20 in the prior art is consequently limited to between 20 and 50 degrees, leading to operational inconvenience for the user.

Figure 4A:
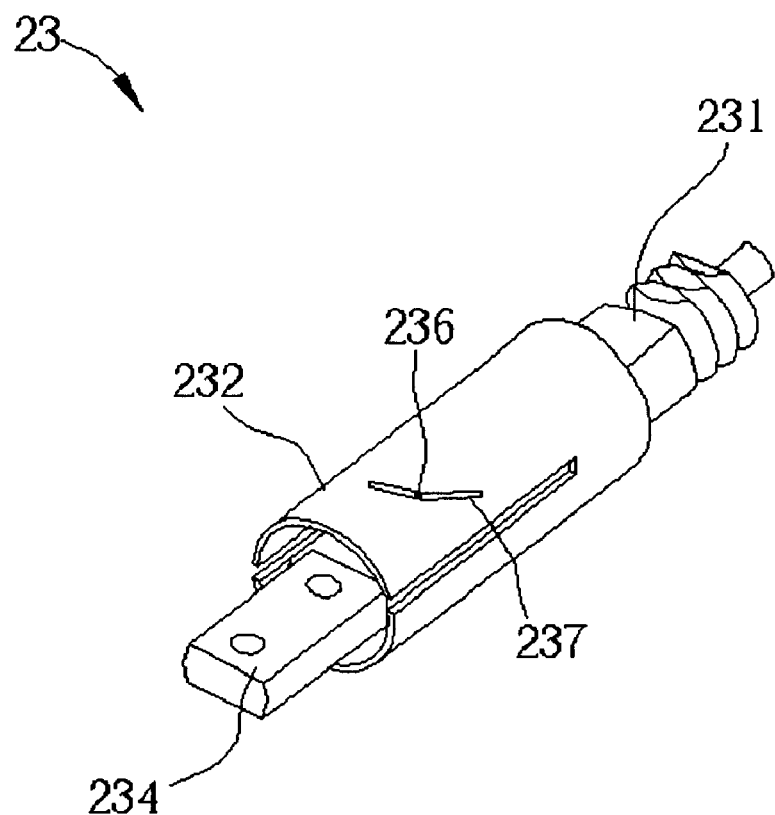
FIG. 4a is a perspective view of a hinge device according to the present invention.
Figure 4B:
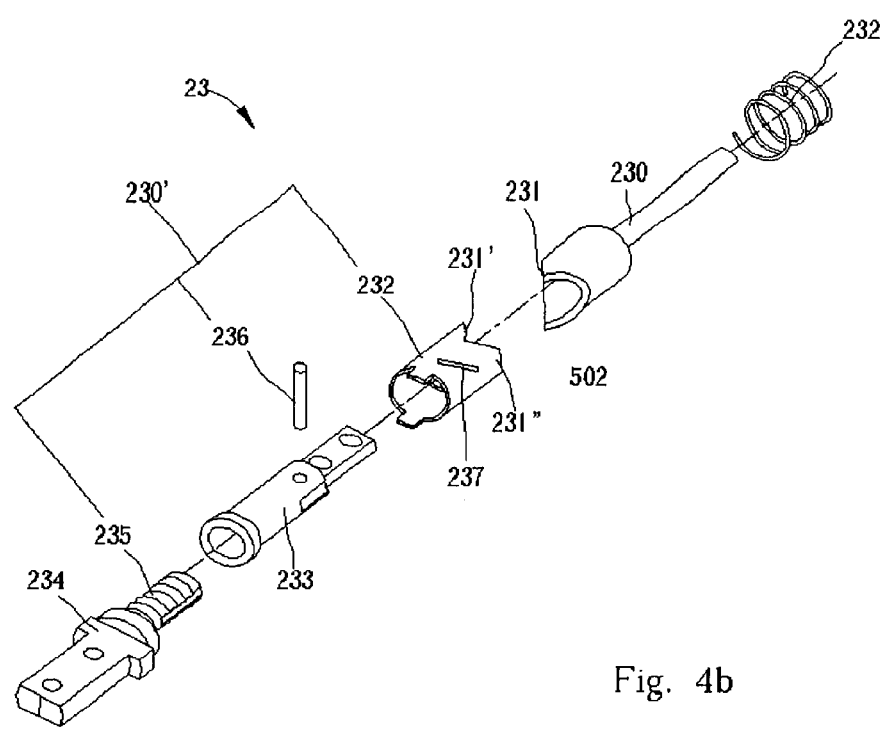

Please refer to FIG. 4a and FIG. 4b, which respectively represent a perspective view and an exploded view of the hinge device 23 according to the present invention. As shown in FIG. 4a and FIG. 4b, the hinge device 23 comprises a first V-shape connection rod 230 and a second V-shape connection rod 230" that connect to each other in a rotatable manner. The first V-shape connection rod 230 comprises a connection end connected to the hinge 24 by either a rivet or a screw, and also comprises a V-shape protruding end 231. The hinge normally comprises a gag device for limiting the rotational angle of the display panel 21 with respect to the computing module 20 to between 0 and 180 degrees. The V-shape protruding end 231 provides the torque to the first V-shape connection rod 230 for engaging with the second V-shape connection rod 230", and thus the protruding end 231 is at an angle ranging from 15 to 50 degrees. Normally, the first V-shape connection rod 230 is a device formed by metallic injection molding and comprises the V-shape protruding end 231 and a hollow end. In the preferred embodiment of the present invention, a spring is installed in the hollow end of the first V-shape connection rod 230 to reinforce the torque provided for engaging the first and second V-shape connection rods 230 and 230".

The second V-shape connection rod 230" comprises a hollow cylinder 232, a connection shaft 233, and a transmission shaft 234. The hollow cylinder 232, the connection shaft 233, and the transmission shaft 234 are formed by metallic injection molding, and any two can be connected by a rivet or a screw. The hollow cylinder 232 comprises a connection end connected to the connection shaft 233 for transferring torque to the movable base 111 for rotating the rotatable display panel 21. In the preferred embodiment of the present invention, the connection shaft 233 comprises a first end rotatably inserted to the hollow cylinder 232 in order to make the display panel 21 rotate at predetermined angle, such as 60 or 120 degrees, with respect to the computing module 20. The hollow cylinder 232 further comprises an indented end 231" having an engaging groove 231"", with an angle between the indented end 231" and the engaging groove 231"" ranging from 45 to 70 degrees and preferably being 60 degrees. When the protruding end 231 engages with the engaging groove 231"", the second connection rod 230" will rotate with the first connection rod 230. The connection shaft 233 further comprises a second end connected to the transmission shaft 234 for transferring torque to the movable base 111. Optionally, a spring is attached to the transmission shaft 234 to enhance the torque to the movable base 111. In the preferred embodiment of the present invention, the connection shaft 233 comprises a gag lever 236 for insertion into an arc-shaped guide groove 237 on the hollow cylinder 232 in order to limit movements of the connection shaft 233 in the hollow cylinder 232. Therefore, the torque of the display panel 21 is transferred to a proper direction to move the movable base 111.

Figure 5:
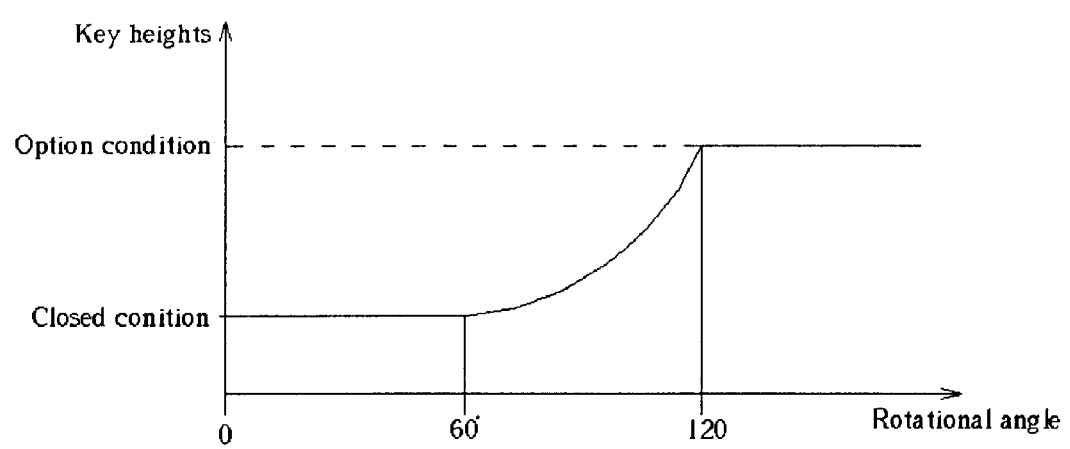
FIG. 5 represents a relationship between the rotational angle of the display panel and the height of the keys according to the present invention.

Please refer to FIG. 5, which represents a relationship between the rotational angle of the display panel 21 and the height of the keys 11. As shown in FIG. 5, when the display panel 21 of the notebook computer 2 is in the closed position, the protruding end 231 of the first V-shape connection rod 230 engages with the indented end 231" of the second V-shape connection rod 230". When the display panel 21 is lifted up to make an angle between the display panel 21 and the computing module 20 increase from 0 degrees to 60 degrees, the first V-shape connection rod 230 rotates with the display panel 21 and the second V-shape connection rod 230" stays still since the first V-shape connection rod 230 rotates within the range of the angle between the indented end 231" and the engaging groove 231"". When the display panel 21 is further lifted up to make the angle between the display panel 21 and the computing module 20 increase from 60 degrees to 120 degrees, the protruding end 231 engages with the engaging groove 231"", causing the first and the second V-shape connection rods 230 and 230" to simultaneously rotate with the display panel 21. The hinge 24 therefore rotates with the second V-shape connection rod 230" to shift the movable base 111 in a certain distance. Simultaneously, each elastic rod 112 of a corresponding key 11 moves with the second V-shape connection rod 230", causing the corresponding key 11 to move upwardly with the rotation of the rotatable rod When the display panel 21 is further lifted up to make the angle between the display panel 21 and the computing module 20 increase from 120 degrees to 180 degrees, the gag lever 236 of the connection shaft 233 and the arc-shaped guide groove 237 of the hollow cylinder 232 limit the movements of the second V-shape connection rod 230" to make the angle between the display panel 21 and the computing module 20 equal to or less than 180 degrees.

On the contrary, when the display panel is closed, making the angle between the display panel 21 and the computing module 20 decreased, the movable base 111 moves back to the original position with the hinge device 23, and the keys 11 move downwardly with the rotation of the rotatable rod 113.

In another embodiment of the present invention, the first V-shape connection rod comprises an indented end having an engaging groove, and the second V-shape connection rod comprises a protruding end. For simplicity of description, the functions of those items in this second embodiment that are similar to those in the previous embodiment are not repeated.

In comparison with the prior art, the space occupation of the hinge device 23 revealed in the present invention is reduced by the internal design of the first and the second V-shape connection rods 230 and 230". In addition, the notebook computer 2 in the present invention utilizes the protruding and indented ends 231 and 231", and is thus friendlier to users. Consequently, the manufacturing cost of the notebook computer 2 is reduced by the simplified arrangement of the components inside the notebook computer 2. In addition, the product is more competitive because of its convenient operation, improved appearance with minimized volume, and customer oriented design.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A hinge device installed between a rotatable panel and a computing module which has a keyboard installed thereon, the hinge device comprising:
   a first connection rod having a connection end connected to the rotatable panel, and a protruding end; and
   a second connection rod comprising:
      a first connection end connected to the computing module;
      a second connection end for transferring torque to a moveable base; and
      a hollow cylinder comprising an indented end for connecting with the protruding end of the first connection rod, the indented end having an engaging groove wherein when the protruding end engages with the engaging groove, at least the hollow cylinder will rotate with the first connection rod.

2. The hinge device of claim 1 wherein the protruding end of the first connection rod and the indented end of the second connection rod are both of a V-shape.

3. The hinge device of claim 1 wherein the second connection rod further comprises a connection shaft and a transmission shaft, the connection shaft having an end inserted to the hollow cylinder, and another end connected to the transmission shaft for transferring torque to the moveable base, another end of the transmission shaft being the first connection end of the second connection rod.

4. The hinge device of claim 3 further comprising a gag lever for inserting into an arc-shaped guide groove on the hollow cylinder for limiting movements of the connection shaft in the hollow cylinder.

5. A hinge device installed between a rotatable panel and a computing module which has a keyboard installed thereon, the hinge device comprising:
   a first connection rod having a connection end connected to the rotatable panel, and an indented end; and
   a second connection rod comprising:
      a first connection end connected to the computing module;
      a second connection end for transferring torque to a moveable base; and
      a hollow cylinder comprising a protruding end for connecting with the indented end of the first connection rod, the indented end having an engaging groove wherein when the protruding end engages with the engaging groove, at least the hollow cylinder will rotate with the first connection rod.

6. The hinge device of claim 5 wherein the indented end of the first connection rod and the protruding end of the second connection rod are bath of a V-shape.

7. The hinge device of claim 5 wherein the second connection rod further comprises a connection shaft and a transmission shaft, the connection shaft having an end inserted to the hollow cylinder, and another end connected to the transmission shaft for transferring torque to the moveable base, another end of the transmission shaft being the first connection end of the second connection rod.

8. The hinge device of claim 7 further comprising a gag lever for inserting into an arc-shaped guide groove on the hollow cylinder for limiting movements of the connection shaft in the hollow cylinder.

9. A notebook computer comprising:
   a computing module having a keyboard installed thereon;
   a panel rotatable with respect to the computing module; and
   a hinge connected between the computing module and the rotatable panel comprising:
      a first connection rod having a connection end connected to the rotatable panel, and a first engaging end; and
      a second connection rod having a hollow cylinder, a connection end connected to the moveable base for transferring torque to the moveable base, and a second engaging end for connecting with the first engaging end of the first connection rod, the second engaging end having an engaging groove wherein when the first engaging end engages with the engaging groove, at least the hollow cylinder will rotate with the first connection rod.

10. The notebook computer of claim 9 wherein the first engaging end of the first connection rod and the second engaging end of the second connection rod are both of a V-shape.

11. The notebook computer of claim 9 wherein the second connection rod further comprises a connection shaft and a transmission shaft, the connection shaft having an end inserted to the hollow cylinder, and another end connected to the transmission shaft for transferring torque to the moveable base, another end of the transmission shaft being the first connection end of the second connection rod.

12. The notebook computer of claim 11 further comprising a gag lever for inserting into an arc-shaped guide groove on the hollow cylinder for limiting movements of the connection shaft in the hollow cylinder.

* * * * *